(12) United States Patent
Rioux et al.

(10) Patent No.: US 7,948,963 B2
(45) Date of Patent: May 24, 2011

(54) SATELLITE MODEM WITH A DYNAMIC BANDWIDTH

(75) Inventors: Patrick Rioux, Montréal (CA); Naïm Batani, Dollard-des-Ormeaux (CA); François Gagnon, Lachine (CA); Jean Belzile, Lachine (CA)

(73) Assignee: Ecole de Technologie Superieure, Montreal, Quebec (CA)

( * ) Notice: Subject to any disclaimer, the term of this patent is extended or adjusted under 35 U.S.C. 154(b) by 1027 days.

(21) Appl. No.: 11/454,782

(22) Filed: Jun. 19, 2006

(65) Prior Publication Data

US 2007/0019605 A1 Jan. 25, 2007

Related U.S. Application Data

(63) Continuation of application No. PCT/CA2004/000584, filed on Apr. 16, 2004.

(60) Provisional application No. 60/530,610, filed on Dec. 19, 2003.

(51) Int. Cl.
*H04J 3/06* (2006.01)
(52) U.S. Cl. ........ 370/350; 370/310; 370/345; 370/347; 455/73
(58) Field of Classification Search .................. 370/310, 370/345, 347, 350; 455/73, 550.1, 557
See application file for complete search history.

(56) References Cited

U.S. PATENT DOCUMENTS

| | | | | |
|---|---|---|---|---|
| 4,252,999 A * | 2/1981 | Acampora et al. | | 370/323 |
| 4,320,502 A * | 3/1982 | deVeer | | |
| 4,625,308 A * | 11/1986 | Kim et al. | | 370/321 |
| 4,763,325 A * | 8/1988 | Wolfe et al. | | 370/322 |
| 5,172,375 A * | 12/1992 | Kou | | 370/322 |
| 5,719,868 A * | 2/1998 | Young | | |
| 5,812,545 A * | 9/1998 | Liebowitz et al. | | |
| 5,898,694 A * | 4/1999 | Ilyadis et al. | | |
| 5,959,999 A * | 9/1999 | An | | |
| 6,005,852 A * | 12/1999 | Kokko et al. | | 370/329 |
| 6,041,233 A * | 3/2000 | Rosati | | |
| 6,052,364 A * | 4/2000 | Chalmers et al. | | |
| 6,091,740 A * | 7/2000 | Karasawa | | |
| 6,189,044 B1 * | 2/2001 | Thomson et al. | | |
| 6,233,429 B1 * | 5/2001 | Soffer et al. | | |
| 6,317,436 B1 * | 11/2001 | Young et al. | | |
| 6,381,227 B1 * | 4/2002 | Fielding et al. | | |
| 6,442,147 B1 * | 8/2002 | Mauger et al. | | |

(Continued)

FOREIGN PATENT DOCUMENTS
WO    WO 0228027    *    4/2002

*Primary Examiner* — William Trost, IV
*Assistant Examiner* — Siming Liu
(74) *Attorney, Agent, or Firm* — Ogilvy Renault, LLP

(57) ABSTRACT

The present invention provides for a method that could be advantageously implemented in a satellite local area network (LAN) in which an average number of sites share a TDMA link. The invention provides for both a dedicated bandwidth to all the sites and a shared bandwidth that is dynamically assigned to the sites, therefore allowing for both synchronous traffic and for on request burst mode traffic. The method includes a reservation method of this shared bandwidth which is specially optimized for a satellite link. The method provides also for a network that automatically managed its communication bandwidth resources and the synchronization of the sites, without the need of an external controller. The present invention also provides for a satellite modem to transmit data from a site, to receive data from the sites and to manage the bandwidth resources of the TDMA satellite in accordance with the above method.

31 Claims, 11 Drawing Sheets

U.S. PATENT DOCUMENTS

| | | | |
|---|---|---|---|
| 6,466,569 B1 * | 10/2002 | Wright et al. | |
| 6,480,495 B1 * | 11/2002 | Mauger et al. | |
| 6,501,765 B1 * | 12/2002 | Lu et al. | |
| 6,535,716 B1 * | 3/2003 | Reichman et al. | |
| 6,570,859 B1 * | 5/2003 | Cable et al. | |
| 6,574,227 B1 * | 6/2003 | Rosenberg et al. | |
| 6,600,754 B1 * | 7/2003 | Young et al. | |
| 6,650,869 B2 * | 11/2003 | Kelly et al. | |
| 6,940,845 B2 * | 9/2005 | Benveniste | 370/349 |
| 2002/0051462 A1 * | 5/2002 | Ertel et al. | 370/442 |
| 2002/0118699 A1 * | 8/2002 | McKinnon et al. | |
| 2002/0167960 A1 * | 11/2002 | Garcia-Luna-Aceves | |
| 2003/0123414 A1 * | 7/2003 | Tong et al. | |
| 2003/0137967 A1 * | 7/2003 | Geva et al. | |

* cited by examiner

SATELLITE MODEM WITH A DYNAMIC BANDWIDTH

CROSS-REFERENCE TO RELATED APPLICATIONS

This patent application is a continuation of PCT Patent Application No. PCT/CA2004/000584 designating the United States, filed on Apr. 16, 2004, which claims the benefit under 35 USC 119(e) of United States Provisional Patent Application No. 60/530,610, filed on Dec. 19, 2003.

FIELD OF THE INVENTION

The invention relates to a satellite communication network sharing a time-division multiple-access links.

BACKGROUND OF THE INVENTION

A time-division multiple-access (TDMA) link offers the possibility to a network composed of earth stations—also called sites—to transmit at a regular frequency their respective signals. The sites share a single-carrier link communication, they send at regular time interval an information packet that is time-shifted from all the other packets, to prevent information collision. Although the link is shared, the communication network can operate with no packet collision, because the sites are well synchronized and there is a reservation algorithm assigning the traffic.

Thus one of the advantages of a network based on a TDMA link is to provide a dedicated bandwidth to each site of the network without the problems associated with information packet collisions and at the same time to utilize almost all the bandwidth resources of the link therefore offering an efficient system. The dedicated bandwidth can be, for example, used to transmit voice communication, a continuous stream of traffic that requires fixed and limited time delays.

However, it could be advantageous for some of these sites, if not for all sites of the network, to have additionally access, from time to time, to an additional portion of the link to send in burst mode information coming from other media, such as emails, file transfers, etc. In other words, to have access, additionally to a dedicated bandwidth, to a dynamic bandwidth that could be shared between some or all of the sites.

It would also be an advantage if a network could offer both bandwidths (dedicated and dynamically assigned) and manage this network automatically without the need of an external controller because those controllers are generally costly. Therefore there is a need for a communication system that is more flexible but still very efficient, and that is in the same time a simpler and cheaper solution then available systems.

SUMMARY OF THE INVENTION

Accordingly, the object of the present invention is to provide a method for providing to a network of sites, sharing a time-division multiple-access (TDMA) satellite link, a dedicated bandwidth for priority traffic and a shared dynamic bandwidth for high flow traffic. The method comprises providing to each site a dedicated bandwidth for priority traffic by assigning to each site at least one dedicated sub-frame, said sub-frame being a time-slot during which the site transmits, and said sub-frame being one of a series of sequential sub-frames organized in a time-repeating sequence called a frame, said frame further comprising in its time sequence a burst sub-frame corresponding to the shared bandwidth available for high flow traffic; providing to each site, at a regular time interval, a reservation micro time-slot during which the site can transmit a reservation for the burst sub-frame of a frame to come; and assigning, as a function of said reservations and according to an assignment protocol, the burst sub-frame to a corresponding site that will be allowed to transmit during said burst sub-frame, therefore providing to the network a dynamic bandwidth for high flow traffic.

The present invention provides also for an automatic management of the communication bandwidth resources of the network, without the need of an external controller, by providing an assignment protocol distributed among all the sites so that when the sites receive the reservations made in a previous time interval they know automatically which sites and in which order they can transmit in the burst sub-frames of a time interval to come.

The present invention also provides for an automatic management of the synchronization of the sites, without the need of an external master clock, by providing a synchronization protocol distributed among all the sites and according to which all the sites establish their own synchronization status and by also providing to each site, at a regular time interval, a time-slot during which the site transmits its synchronization status.

In accordance with the present invention, there is also provided a modem to transmit data from a site, to receive data from a network of sites and to manage a bandwidth resources of a time-division multiple access (TDMA) satellite link shared by the network of sites, wherein said TDMA link provides to the network of sites a shared bandwidth for high flow traffic data, and provides to each site a dedicated bandwidth for priority traffic data and provides to each sites a reservation bandwidth for reservation data in which the site can request a time-slot of the shared bandwidth. The modem comprises a receiving module, a transmitting module, a dedicated bandwidth port, a shared bandwidth port, an input/output controller module, a synchronization module, a framing module, and a reservation module. The receiving module receives a received signal encoding the priority traffic data, the high flow traffic data and the reservation data from the TDMA satellite link, and provides a received data. The transmitting module receives a framed data of the site to be transmitted and a synchronization signal, for transmitting, as a function of said synchronization signal, the framed data through the TDMA satellite link. The dedicated bandwidth port couples the priority traffic data of a subscriber equipment to the modem, whereas the shared bandwidth port couples the high flow traffic data of the subscriber equipment to the modem. The synchronization module is linked to the receiving module for establishing, from the received data, a reference clock time and for generating said synchronization signal. The framing module, receiving a priority traffic data to transmit, a high flow traffic data to transmit, an assignment signal and a reservation signal, stores momentarily in a buffer the high flow traffic data to transmit until its transmission and provides a buffer status signal about the status of the buffer content, and generates, as a function of said high flow and priority traffic data to transmit and as a function of said assignment signal and said reservation signal, the framed data of the site to be transmitted. The input/output controller module, receives the priority traffic data to transmit from the dedicated bandwidth port, the high flow traffic data to transmit from the shared-bandwidth port and the received data, and relays said priority and high flow traffic data to transmit to the framing module, relays said received priority traffic of the received data to the dedicated bandwidth port and relays a received high flow traffic data of the received data to the shared-bandwidth port. The reservation module, adapted to manage the reservation data and the shared-bandwidth resources, has a first port connected to the receiving module for acknowledging from the reservation data of the received data said time-slot requests of the sites, and has a second port connected to the framing module, for receiving the buffer status signal and for transmitting to the framing module the assignment signal and the reservation signal. The reservation module generates, as a function of said requests of the sites and as a function of an assignment protocol, the assignment signal informing the framing module when to incorporate, in said framed data, the high flow traffic data to transmit in the shared-bandwidth of the TDMA link, and generates, in response to the buffer status signal and as a function of the assignment protocol, the reservation signal informing the framing module when to request, in the reservation data, a time-slot of the shared-bandwidth of the TDMA link.

In accordance with the present invention, the synchronization module also provides for an automatic management of the synchronization of the sites, without needing an external master clock and the reservation module provides for an automatic management of the bandwidth resources of the network without an external controller.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
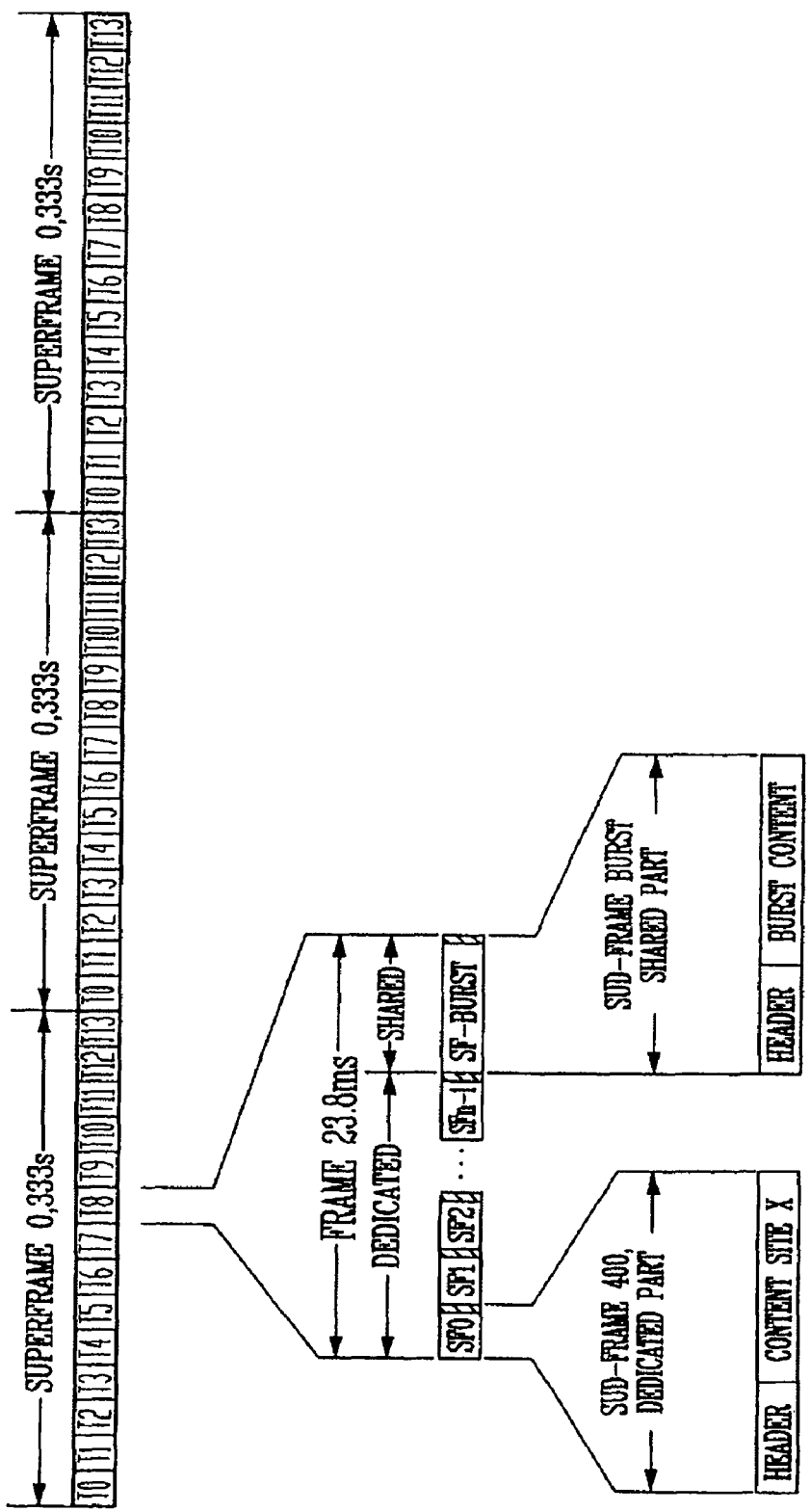
FIG. 1 is a schematic view of the architecture of a TDMA link in accordance with a preferred embodiment of the invention.

In the preferred embodiment of the present invention, the communication system is based on a TDMA link having the structure describes in FIG. 1. The link is structured in a series of sub-frames, frames and super-frames where a super-frame corresponds to a group of frames, and where a frame corresponds to a group of sub-frames. These three components are associated with the structure of the transmitted information: the super-frame allows for the management of the reservations made by the sites to acquire high flow traffic burst transmission slots, the frames define the structure of a cycle of transmission and the sub-frames contain the information emitted by the sites.

Here, in this preferred embodiment, the communication system provides a total bandwidth of 128 kbs, 256 kbs, 512 kbs, 1 Mbs or 2 Mbs depending on the value of the bit transmission rate of the network link. A person skilled in the art will appreciate that this invention could also be implemented in a system providing a higher transmission rate link.

Frames and Sub-Frames

Referring to FIG. 1 the TDMA link of the preferred embodiment is divided in a series of frames having time duration of 23.8 ms. As shown in the figure, depending on the link rate transmission, each frame contains a certain number of bits. For transmission rates varying form 128 kbs to 2 Mbs, the number of bits per frame will therefore comprise between 4279 bits to 69888 bits. Naturally, the link structure of the invention could also be based on frames having another time duration or another number of bits, as someone skilled in the art will appreciate.

Each frame is further divided in two time portions: one which is dedicated to each sites of the network and one which is assigned dynamically to the sites upon request. The latter portion is illustrated on FIG. 1 as the "burst" portion and is also called a "burst sub-frame" (SF-BURST). The dedicated portion, as illustrated in FIG. 1, is divided in N number of segments (labeled SF0, SF1, to SFN-1) called dedicated sub-frames, which are time-slots that are assigned to the sites of the network in order to provide each site with a regular link service to transmit a continuous stream of traffic that requires fixed and limited time delays. Thus there are two types of sub-frames: the dedicated sub-frames of the dedicated channels and the sub-frames for burst data. Once the time-duration of the dedicated sub-frames and their number is settled, the sub-frame for the burst channel uses the remainder number of bits of the frame.

Thus the preferred embodiment proposes a TDMA link architecture that allows for both priority traffic and high flow traffic by using a frame structure that has a dedicated portion and a shared-portion. The dedicated portion is the first portion of the frame which is made of N segments of bandwidth (dedicated sub-frames) dedicated to each site. These segments are assigned and present in each frame in order to provide to each site a maximum of fluidity for priority traffic. The second portion of the frame is a shared-portion of the TDMA link that is assigned to only one site in each frame. This approach maximizes the total performance of the traffic high flow and provides thus for a very efficient system.

Concerning the time duration of the dedicated sub-frames, as illustrated in FIG. 1, the time duration of the dedicated sub-frames will vary depending on the transmission rate of the signal associated with this sub-frame. For example, if the bit transmission rate is 64 kbs, as it is often the case for voice transmission, then the dedicated sub-frame will have a length of approximately 1600 bits. In the present embodiment the dedicated sub-frames associated with the priority traffic are allocated in sub-frames equivalent to 16 kbs, 32 kbs or 64 kbs, which corresponds to a sub-frames length of approximately 400, 800 or 1600 bits because the frame has a time duration of 23.8 ms. This allocation follows also a series of rules which are in the present embodiment the following:

all the sites must use dedicated sub-frames of the same length (400, 800 or 1 600 bits), all the sites must have a minimum of one dedicated sub-frame, and the dedicated sub-frames will be always transmitted in the same order.

A person skilled in the art will appreciate that another series of rules could also be used to manage the dedicated bandwidth without changing the scope of this invention.

It is worthwhile to mention that the number of dedicated sub-frames can be equal to the number of the sites, so that each site as one dedicated sub-frame per frame. Also, there can be more sub-frames than the number of sites in the network, in the case where one or several sites need more than one dedicated sub-frame. Furthermore, in some situation where a site is inactive, its dedicated sub-frame can be removed temporarily and assigned to the burst sub-frame of the frame.

Concerning the time duration of the burst sub-frames (or its corresponding length in terms of bits) as discussed below, it will depend not only on the number of reminder bits of the frame (bits that are not used by the dedicated sub-frames) but also on the real number of bits, NB, available for signal transmission.

The frame represents a complete cycle of transmission that contains dedicated sub-frames and a burst sub-frame. In this preferred embodiment, the frame does not have a specific heading but sub-frames do have headers, as illustrated in FIG. 1, that are between 40 to 60 bits. These bits are used to synchronize the sub-frames, since the temporal multiplexing is done on the level of the sub-frame, and as discussed below, to pass information of management between the sites.

Super-Frames

Turning now to the super-frame, the super-frame is a conceptual structure that is introduced to manage the process of burst sub-frame reservation. It actually represents a regular time interval between two reservation events. For example, in the preferred embodiment, 14 frames of 23.8 ms form a super-frame and therefore a super-frame has a time duration of 333 ms. This structure provides for an optimized reservation scheme that takes into account the time delay of about 300 ms between the signal transmission from a transmitting site to the signal reception at a receiving site. The sites transmit their reservations for the shared-portion of up-coming frames in the last frame of each super-frame, in a so-called reservation time micro-slot. Those reservations are transmitted by each site in the header of their respective dedicated sub-frame in the last frame. Naturally, other reservations micro time-slots can also be used as it will be appreciated by one skilled in the art. In this embodiment, all the sites transmit in the last frame (frame 13 in FIG. 1) of a super-frame (super-frame 1) their requests. About 300 ms later (the time it takes to the signal to be transmitted from one site to the others via the satellite), thus during the frame 12 of the following super-frame (super-frame 2), all the sites will receive the requests of all the sites. The sites can therefore prepare to transmit their burst information in the subsequent super-frame (super-frame 3) if they are allowed to transmit.

It will be obvious for someone skilled in the art that other reservation schemes are also possible such as, for example, a reservation system in which the reservation event and the transmission event are separated by more than one super-frame.

This invention provides for an assignment protocol which establishes which sites are allowed to transmit in the shared-portion of each frame. Because this assignment protocol is known to all sites, all the sites know which site is authorized to use the share portion of a determined frame to come, and therefore can prepare its transmission packet accordingly. The reservation scheme combined to the TDMA link architecture provides a fast and reliable reservation method that do not increase the time delay of about 300 ms associated with the earth-satellite distance.

The assignment protocol is based on a series of rules and algorithms that are embedded in each site transmission system (modem) and are therefore known by all sites. In a preferred embodiment, the assignment protocol comprises algorithms to manage automatically and without the need of an external controller, the bandwidths resources of the link. It will be appreciated by some skilled in the art that an external controller could as well be used as a master manager to manage the bandwidth resources. In the following section the rules of the bandwidth attribution are described.

Assignment Protocol: Rules of the Shared-Bandwidth Attribution

In the preferred embodiment where there are 14 frames between each reservation event (or super-frame), the assignment protocol is assigning a sequence of 14 site numbers for each super-frame of the link.

According to the above description, the reservations are made in a previous super-frame, which is two super-frames away form the super-frame in which the assigned sites will be transmitting. In between those super-frames, there is a super-frame, to which we will referred to as the present super-frame, and during which the sites are receiving the reservation requests that were sent in the previous super-frame. It is also during this present super-frame that sites know (from the assignment protocol) which sites will be allowed in the next super-frame to transmit during the burst sub-frames and in which order, the so-called site sequence.

Many assignment protocols could be used to manage the shared-bandwidth attribution, as it will be obvious for someone skilled in the art. We will now describe in more details one of these possible assignment protocols.

The assignment protocol of this preferred embodiment establishes a starting point site from which the sequence can begin. This starting point site is established at every super-frame according to a starting point algorithm to make sure that the first sites will not be privileged in the assignment protocol and to modify the starting point for the priority of the reservation for each super-frame. The algorithm is the following:

We add+14 modulo (Number of sites in the network) to the preceding starting point.

For a better understanding, here is an example where the network comprises 50 sites:

Starting point #1: Site 0
Starting point #2: (0+14)mod(50)=Site 14
Starting point: #3: (14+14)mod(50)=Site 28
Starting point: #4: (28+14)mod(50)=site 42
Starting point: #4: (42+14)mod(50)=site 6

Here is another example for a network of less than 14 stations:

Number of sites: 12
Starting point #1: Site 0
Starting point #2: (0+14)mod(12)=Site 2
Starting point #3: (2+14)mod(12)=Site 4
Starting point #4: (4+14)mod(12)=Site 6
Starting point #5: (6+14)mod(12)=Site 8
Starting point #4: (8+14)mod(12)=Site 10
Starting point #4: (10+14)mod(12)=Site 12
Starting point #4: (12+14)mod(12)=Site 2

Once the starting point site has been established, the 14 burst sub-frames of a super-frame are then assigned to the sites that have made previously a reservation by allowing the frames in the order of the number of the sites beginning by the starting point site. For example if the following 14 sites have made a reservation for one burst, the 14 burst sub-frames of a super-frame to come will be assigned to the following sequence of sites.

Demand (the 14 sites that have made a reservation):
Sites: 2, 3, 5, 9, 15, 16, 17, 18, 19, 25, 29, 30, 31, 32
Starting point: site number 12
Assign: (the orderly sequence of sites that are allowed to transmit):
Sites: 15, 16, 17, 18, 19, 25, 29, 30, 31, 32, 2, 3, 5, 9

If there are more than fourteen (14) sites requesting one burst, then the fourteen first will have an assigned frame and the others will have to remake a request for the following super-frame. For example:

i. Demand:
Sites: 2, 14, 16, 23, 29, 5, 7, 19, 17, 21, 26, 6, 8, 24, 9,
Starting point site: 2
i. Assign:
Sites: 2, 3, 5, 6, 7, 8, 9, 14, 16, 17, 19, 21, 23, 24, When the number of sites requesting a burst is less than fourteen (14), then the protocol assigns a frame for each one in the ascending order of the number of site. If there remains empty frames, they will be giving between the sites having a priority of reservation. For example:

i. Demand:
Sites: 3, 22, 18
i. Starting point: 1
ii. Assign:
Sites: 3, 18, 22, 3, 18, 22, 3, 18, 22, 3, 18, 22, 3, 18

If more than one burst is requested by some sites then the protocol gives the frames according to the request which was made. Also, if there are frames that have not been reserved, then the protocol distributes those frames by the round-robin algorithm between the sites with a priority of reservation. Here is an example where only 8 frames have been requested by the sites 3, 6, and 8, and where the six remaining frames are given between sites 3, 6, and 8.

i. Demand:
Site 3 request for 2 frames
Site 6 requests for 1 frame
Site 8 request for 5 frames
Assign:
Sites: 3, 6, 8, 3, 8, 8, 8, 3, 6, 8, 3, 6, 8

If there is no request for the burst portion, the protocol will assign the frames from the starting point site. For example if the starting point site is 12, then the frames will be given to the following sequence of sites:

12, 13, 14, 15, 16, 17, 18, 19, 20, 21, 22, 23, 24, 25
and if for the following super-frame there are still no request, the next sequence of assigned sites will be:
26, 27, 28, 29, 30, 31, 32, 1, 2, 3, 4, 5, 6, 7
and so on as long as request is made by at least one of the sites.

Also if there are less than 14 sites but the request is for more than 14 frames, then the protocol will assign the frames according to the request and for the frames which could not be treated, the sites will have to remake a request in next super-frame. Here is an example:

i. Demand
Site 3 request for 4 frames
Site 6 requests for 1 frame
Site 8 request for 9 frames
Site 12 request for 2 frames
i. Assign
Sites: 3, 6, 8, 12, 3, 8, 12, 3, 8, 3, 8, 8, 8, 8

As it can be noticed, in the last example, the site 8 required 9 frames but it only got 7 frames. Site 8 will therefore have to make an additional request for 2 frames for the following super-frame.

It is very important to take note that the site that is the starting point will have to put a flag that indicates that it is the starting point. Also, if a site didn't receive the request of reservation from any other sites, it does not transmit in the shared bandwidth for the next super-frame, even if it is allowed, in order to avoid any risk of collision.

We have described a complete assignment protocol that is used in the preferred embodiment. As will appreciate one skilled in the art, other protocol assignments could also be implemented that are based, for example, on the notion of priority traffic where sites are assigned by priority.

Satellite Modem and Management of the System

In the present embodiment, a modem with which is equipped each site of the network is the centre piece of the installation of the communication network.

The modem has two ports of Ethernet type, one for the priority traffic and the other for the high flow traffic to which are associated the two different portions of each frame. Into the modem is embedded the assignment protocol which provides for an automatically managing of the bandwidth resources of the network, and particularly, identifies which site is authorized to use the shared portion of a determined frame to come. The modem comprises also a series of algorithms to control the proper operation of the system. Among those there is an algorithm for the proper synchronization of the sites, and several algorithms to add or retrieve a site to the network and to reconfigure the frames accordingly. In the following we will describe in more detail these algorithms.

Rule for the Proper Synchronization of the Sites

Synchronization is very important in a satellite network. Each station needs to be synchronized to a same reference point. To do so, a set of rules must be provided. Many synchronization schemes are possible and we will now describe one of them.

In the preferred embodiment, each site has a synchronization status flag that is issued at each super-frame. The status flag, SSF, can have the following states:

SSF=M: the site claims to be the master and has a valid clock;
SSF=S: the site is taking is reference from the master and has a valid clock reference;
SSF=C: the site has a valid clock reference but does not see the master;
SSF=LL: the site has a low power level;
SSF=OM: the site left its role of master for a time period;
SSF=B: the site sees nobody.

Furthermore, to each site is associated a rank number. In the preferred embodiment, the rank of site is established when the site is added to the network. To the rank number corresponds a confidence level on the general status and reliability of the site. The smaller the rank number is, the higher is the confidence level in this site. The rank of a site can be defined using various criteria such as valid clock reference, site power, etc. The rank number of the site is used in the synchronization process.

Here are the rules for synchronization of this preferred embodiment:

The sites synchronize on the lowest rank site they see with SSF=M or S. If there are no sites with SFS=M or S, the sites synchronize on the lowest rank site they see;
A site with a low receive power level raises its SSF to LL;

When a site with valid clock and an adequate power level sees for 3 super-frames a lower rank site with SSF=M, then it puts its SSF=S (except for item 6 below);

If a site with a valid clock reference (SSF=S) and an adequate power level does not see a lower rank site with SSF=M or S for (2×its rank number) consecutive super-frames, then it raises its SSF to M for a minimum of 10 super-frames. Since its reference of synchronization was the old master site, the new master site will have the same clock as the old one;

If a site with SSF=M receives a SSF=M with a better power signal from a site with an higher rank for 6 consecutive super-frames, then it indicates that it is not receiving properly for clocking and that it must temporarily leave its role of Master. It puts its SSF=OM for a period of time equal to 60 minutes. After that period, if its power level is good, it reinstates its SSF=M and clocks with higher rank number should drop their SSF to S according to item 4.

As mentioned above, other synchronization schemes, such as for example one in which the master site is assigned to sites one after the other, could equally be used in the frame of this invention.

Reconfiguration of Frame

Figure 2:
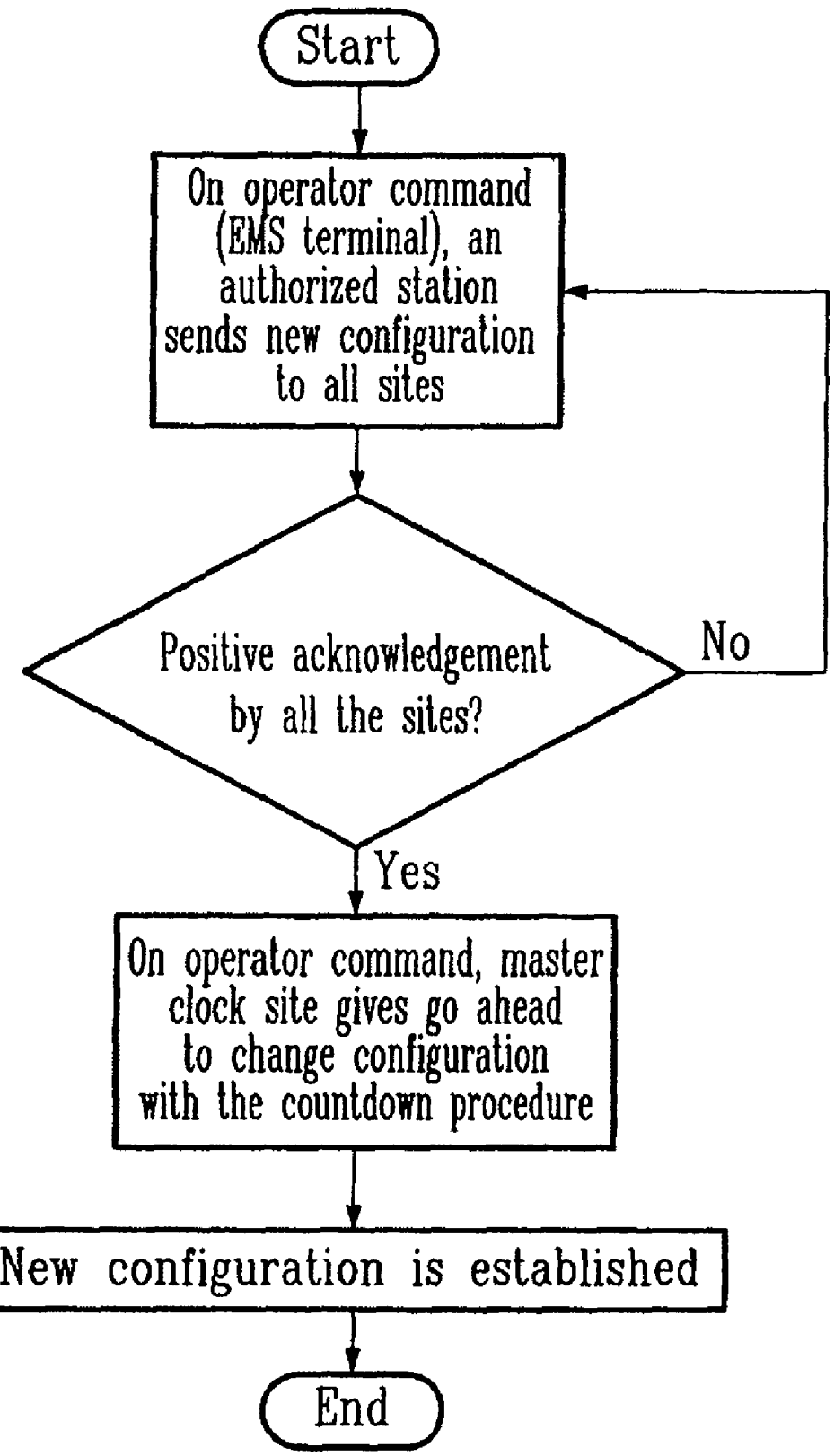
FIG. 2 is a flow chart of a frame reconfiguration procedure in accordance with the preferred embodiment of the present invention.
Figure 5:
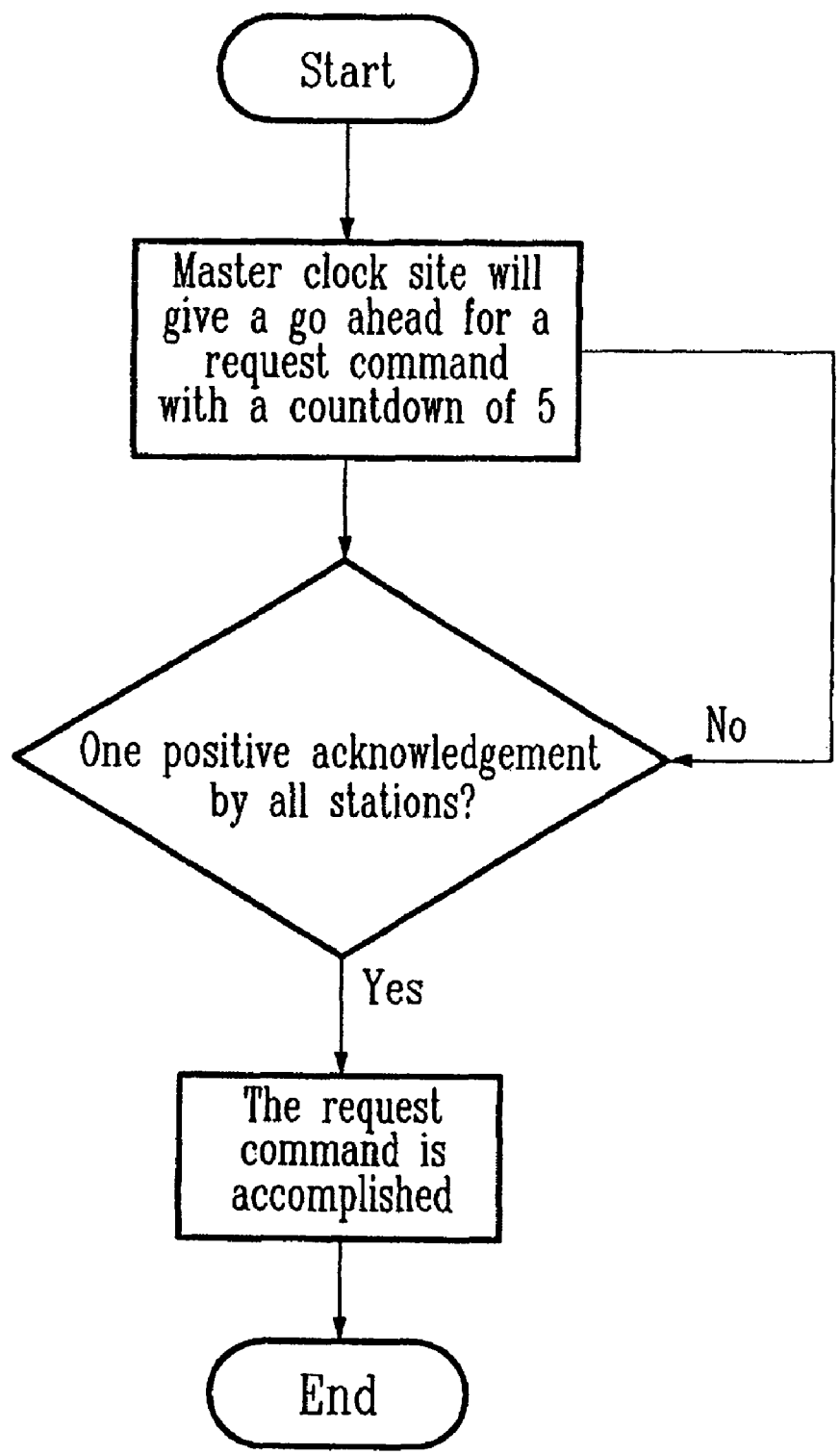
FIG. 5 is a flow chart of a countdown procedure in accordance with the preferred embodiment of the present invention.

FIG. 2 shows the steps of an algorithm that is used in the preferred embodiment to reconfigure a frame. A frame can be reconfigured for many reasons: a site can be eventually added to the network and thus a new sub-frame will be needed, the number of sub-frames assigned to one site can increase or decrease, and so on. The algorithm provides for first sending to all sites the new frame configuration parameters and waits for the positive acknowledgment of all the sites to modify the frame configuration. After having received the positive acknowledgment, the master clock site gives the signal to all sites to change the configuration following a countdown procedure. This countdown procedure is also illustrated in FIG. 5. The following table illustrates the chronological steps that leads to a frame reconfiguration according to this countdown procedure. In this example, it takes five steps to establish a new configuration (Go status).

| Request | # | Acknowledgment by all sites | Status |
| --- | --- | --- | --- |
| Change conf. | 5 | No | No go |
| Change conf. | 4 | No | No go |
| Change conf. | 3 | Yes | Go |
| Change conf. | 2 | Yes | Go |
| Change conf. | 1 | Yes | Go |
| Change conf. | 0 | Yes | Go |

Adding/Removing a Site to the Network

Figure 3A:
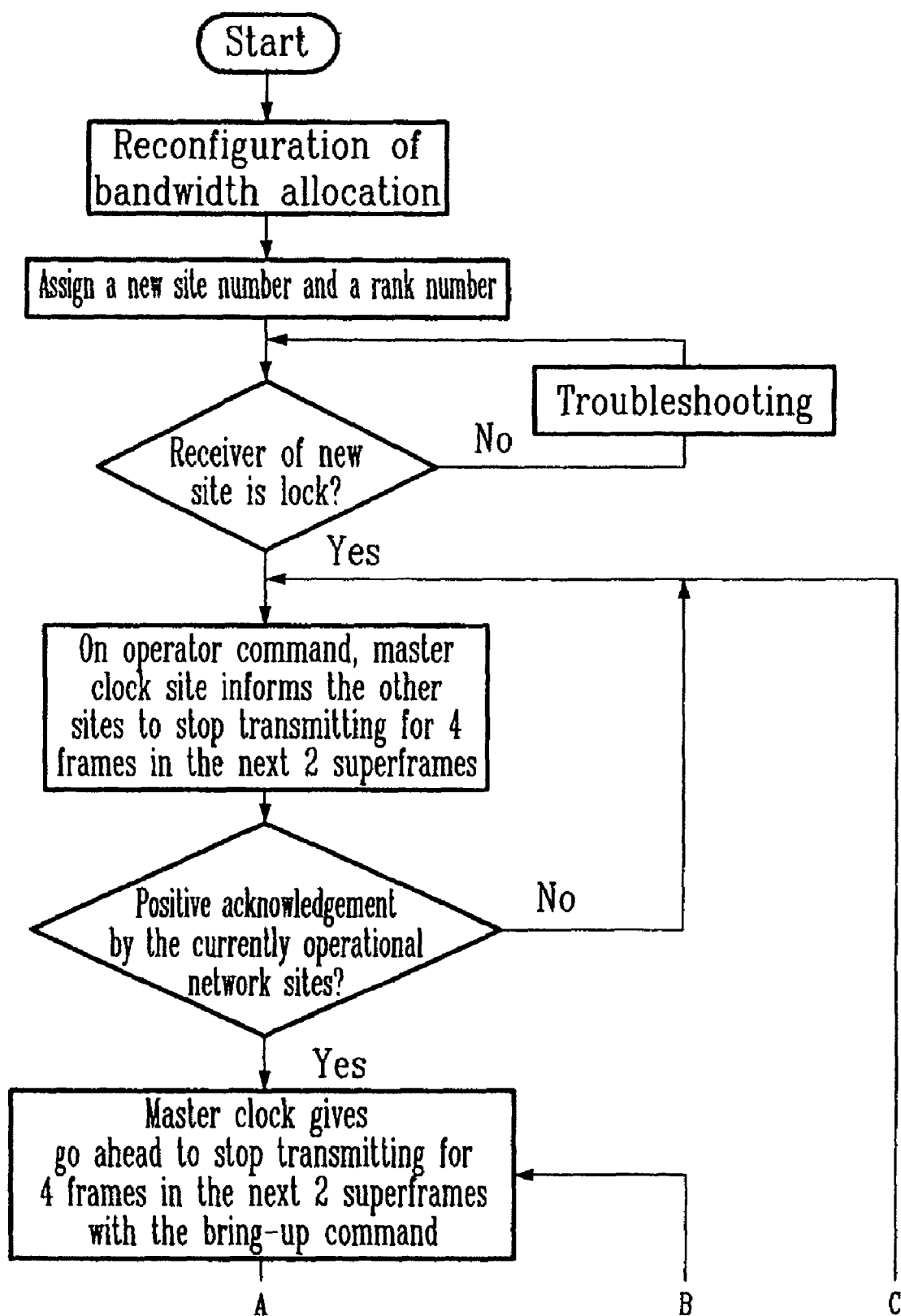
FIG. 3a and FIG. 3b are flow charts of procedure to add a site to a network in accordance with the preferred embodiment of the present invention.
Figure 3B:
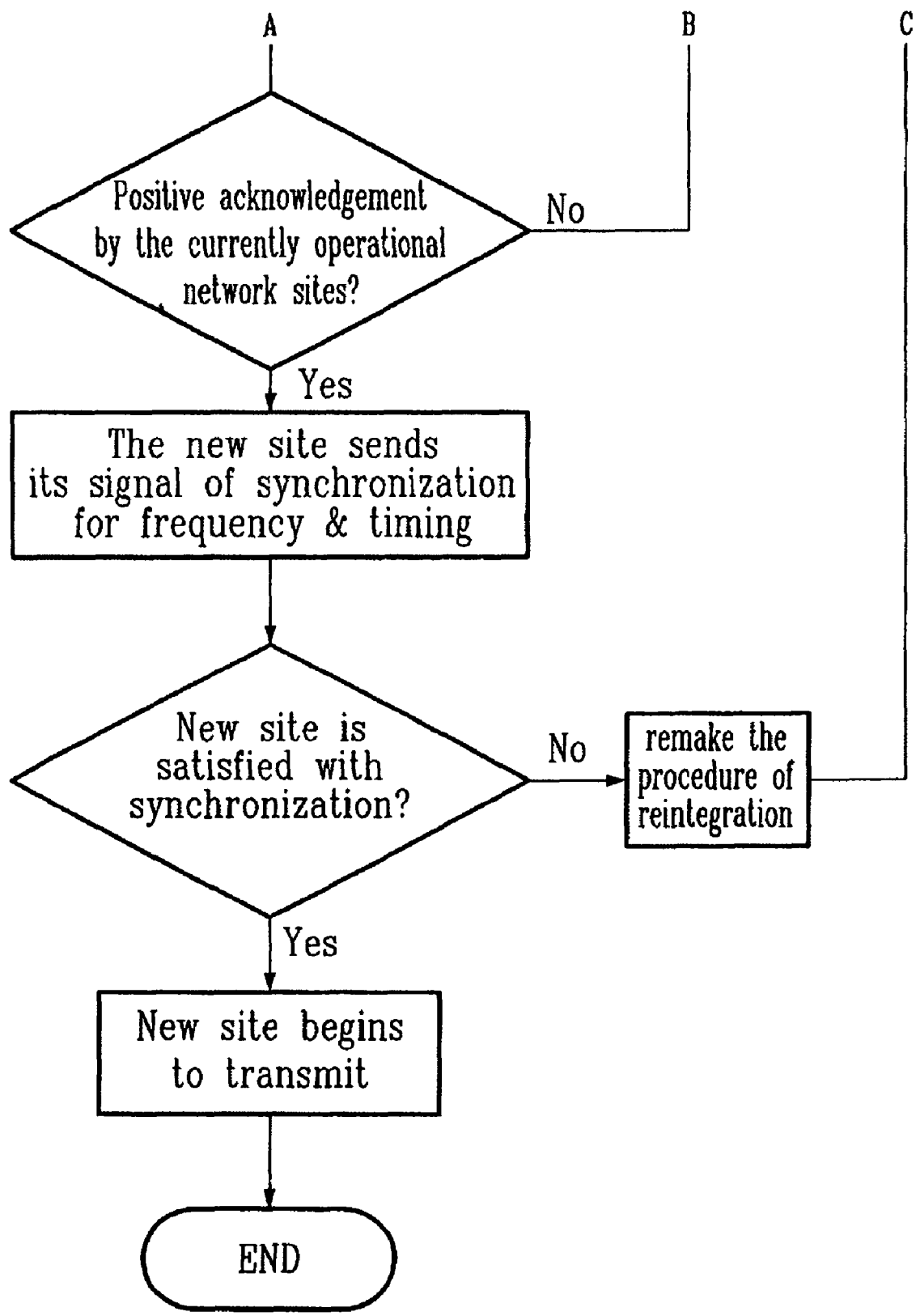
Figure 3C:
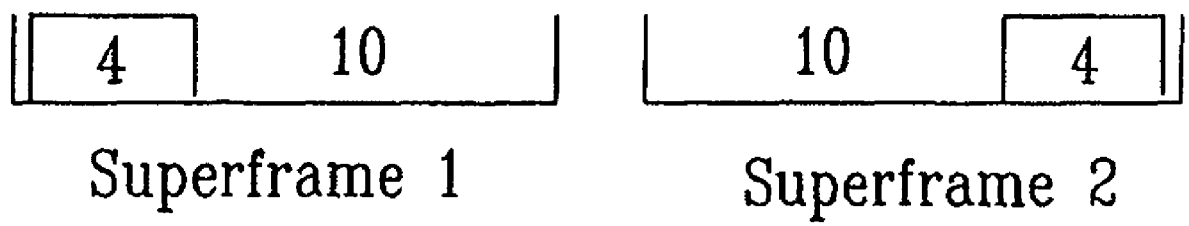
FIG. 3c is a flow chart to illustrate two consecutive super-frames during the procedure of the establishment of the new signal synchronization in accordance with the preferred embodiment of the present invention.

FIG. 3 a shows the steps of an algorithm that is used in the preferred embodiment to add a site to a network. The first step of this procedure is to modify the frame configuration in order to provide a dedicated bandwidth to the new site. This is done using the procedure that was just described above.

Once the frame has been properly reconfigure, a new site number and a new rank number are assigned to the new site. Then a series of verifications are made to verify that all the sites of the network acknowledge the presence of the new site. Then in order to establish the synchronization of the modified network, the sites stop transmitting for four frames in two consecutive super-frames. FIG. 3b illustrates two consecutive super-frames during the procedure of the establishment of the new signal synchronization. Then the new site sends its signal of synchronization and if the site is satisfied with its synchronization status then the new site can transmit.

Figure 4:
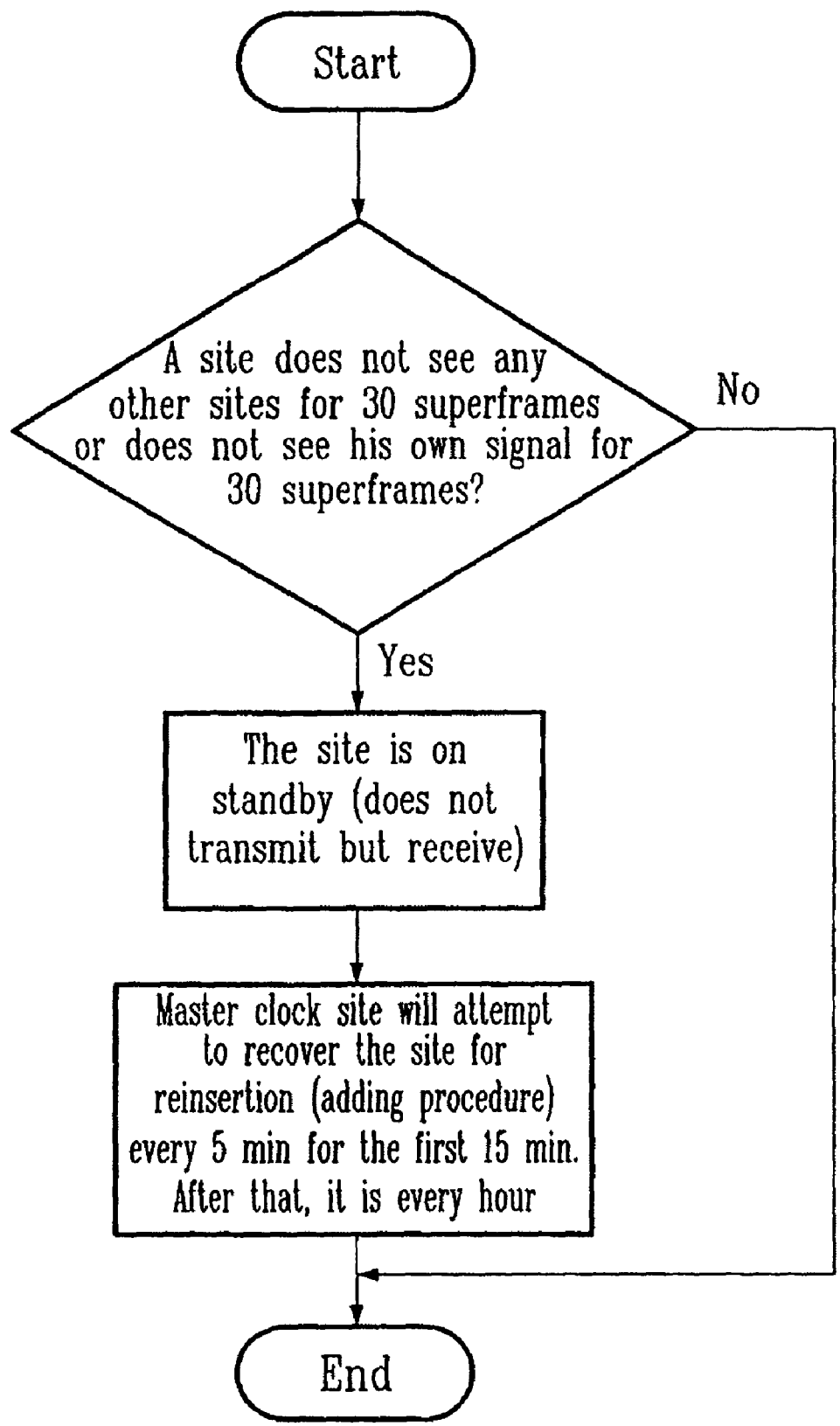
FIG. 4 is a flow chart of a procedure to remove a site from the network in accordance with the preferred embodiment of the present invention.

FIG. 4 shows the steps of an algorithm that is used in the preferred embodiment to ensure that a site of the network that cannot see its own signal or the signal from one of the sites of the network will not transmit.

Architecture of the Modem

We will now describe in more details the architecture of the satellite modem used in accordance with the preferred embodiment of the present invention.

Figure 6:
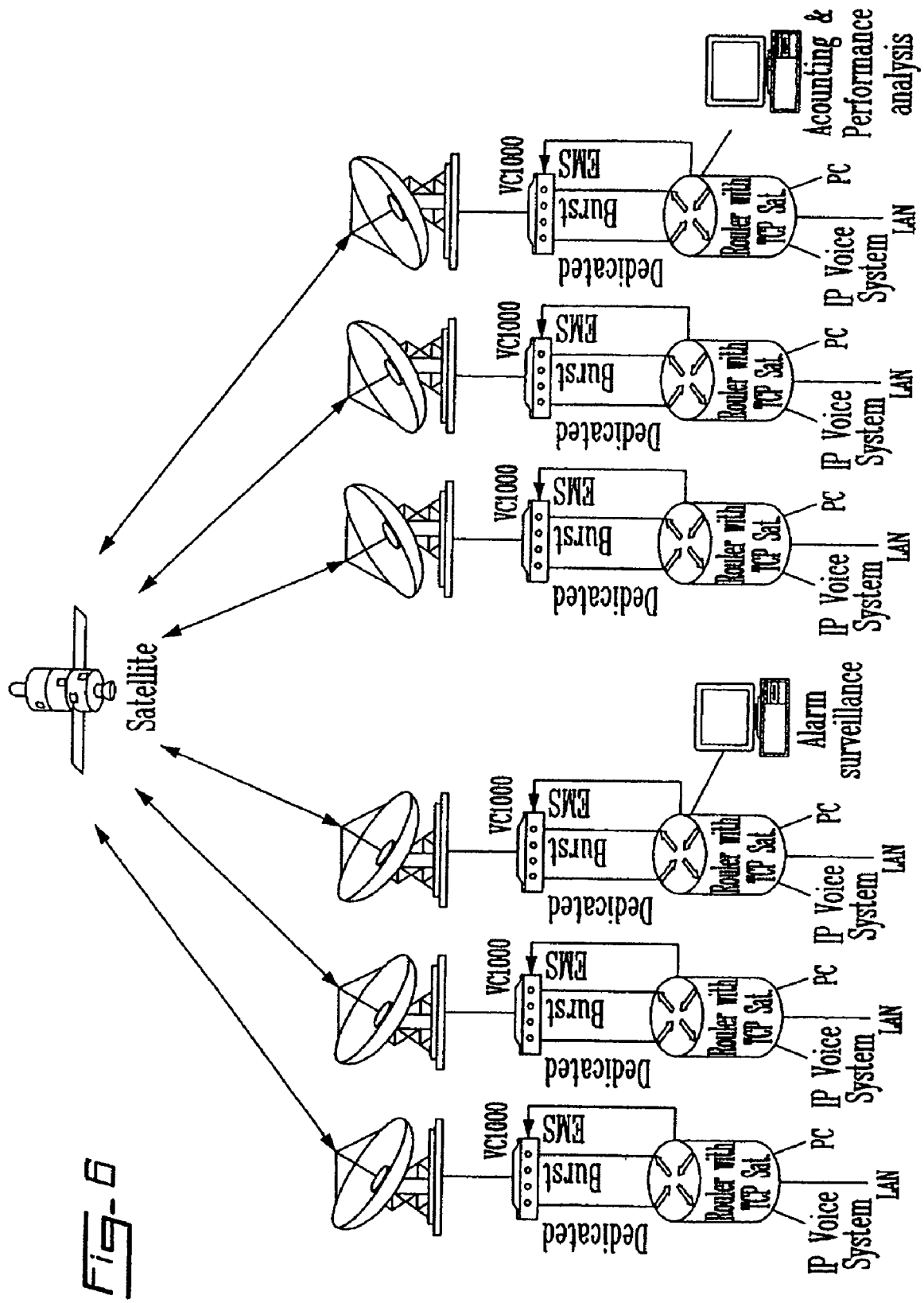
FIG. 6 is a schematic view of the network of sites communicating via the satellite TDMA link in accordance with the preferred embodiment of the present invention.

The satellite modem provides shared bandwidth via a meshed network (FIG. 6) for two data types, continuous stream like voice and bursts such as data. The modems in the network are all identical without the requirement for a central hub or controller. Management of peer to peer functions are embedded in the assignment protocol that was described earlier in the disclosure and which is responsible for sharing the shared-bandwidth of the TDMA link and maintaining coordinated communications.

Figure 7:
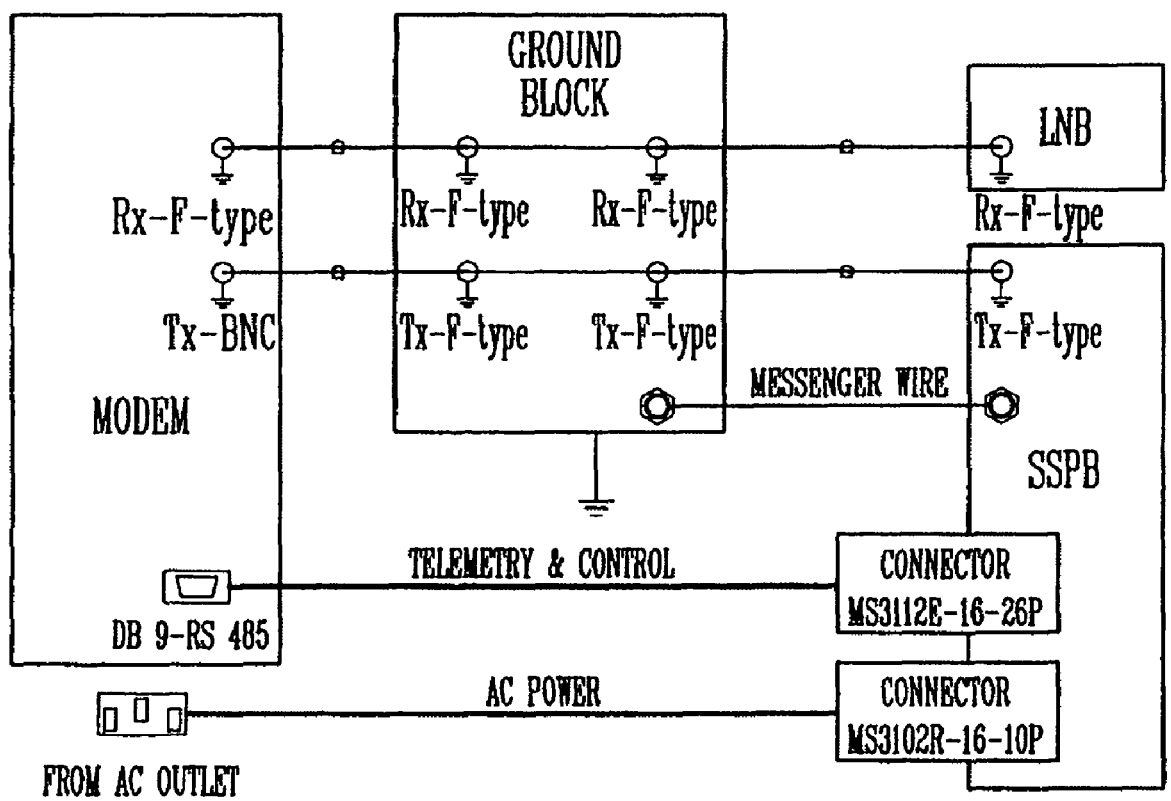
FIG. 7 is a schematic view of the modem connected to a receiver and a transmitter in accordance with the preferred embodiment of the present invention.

In the preferred embodiment of this invention, the satellite modem has three Ethernet ports, an RS485 interface, two L-Band interfaces ports and a display port. The three Ethernet ports are connected to a router, a PC or any device providing the data traffic. The connections on the satellite side, between the modem and the site transmitter and receiver, are illustrated in FIG. 7 and are therein briefly described:

A transmitter coaxial line delivers a transmitter intermediate frequency signal (IF) in the L-band and a 10 MHz reference signal to the solid state power block up converter (SSPB).

A receiver coaxial line delivers the receive L-band signal from the low noise block filter (LNB) to the modem and delivers the DC power supply from the modem to the LNB.

A messenger wire connected to the grounding block provides grounding and lightning protection for the outdoor unit (ODU). Normally the grounding block must be securely attached to the building ground wire or other proper grounding.

A telemetry and control channel is used for monitoring the SSPB. It includes the number of alarms and control commands required for proper station operation and monitoring.

The AC power line is a regular one phase AC line with a grounding wire.

Figure 8:
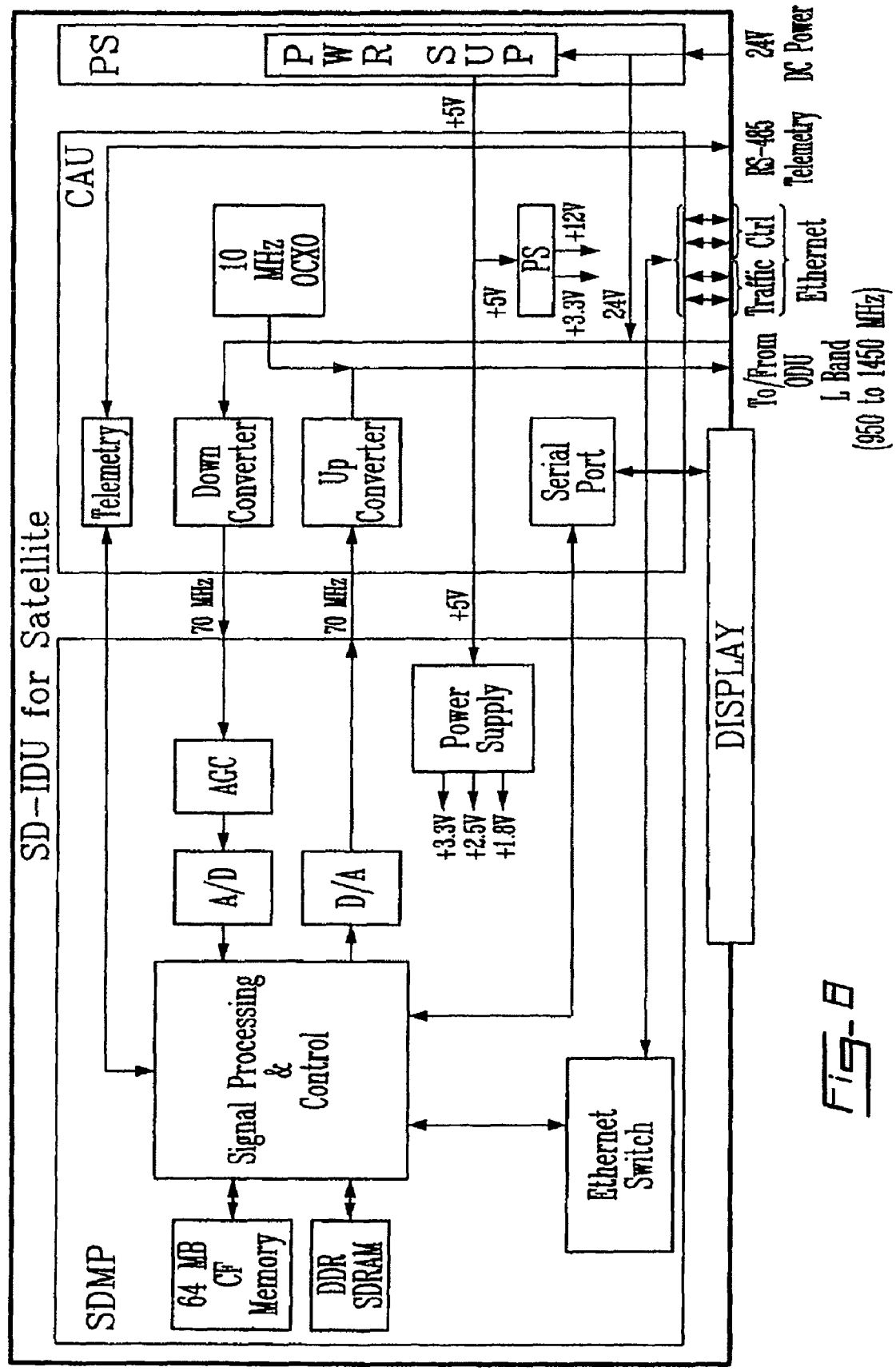
FIG. 8 is a block diagram illustrating the high level internal architecture of the modem in accordance with the preferred embodiment of the present invention.

The high level internal architecture is presented in FIG. 8. A software defined modem platform (SDMP) implements the basic functionality of the modem, controller and input multiplexer. In order to keep the design general, all interfaces are implemented on the control access unit (CAU). The CAU implements all functions that are specific to the ODU, the power source, and the customer premises interfaces. The SDMP is viewed as a common circuit for all indoor units (IDUs) whereas the CAU is more model and/or ODU dependant. Several product lines could be derived from this concept by changing the CAU only.

A compact Flash Memory Card is used as the "hard drive" of the SDMP. It sits in a socket and can be removed to do a software and a firmware upgrade locally. It also permits easy expansion to larger "disk drives" if the size should prove to be a restriction in a future modem version.

The field programmable gate array (FPGA) is the core of the SDMP, it hosts the embedded Power PC (PPC) general purpose processor. The FPGA implements all firmware required to interconnect the various components of the board and to perform high speed signal processing and control. Via the PPC it also runs the primary and ancillary software.

A DDR SDRAM is used to store information during the operation of the system.

The Ethernet switch is a multiport device where three ports are exported to the external world. One port is used for the local IDU management. This is the preferred management port. The other two ports are associated with the low (shared-bandwidth) and high (dedicated bandwidth) priority traffic. These ports partially satisfy the user ports requirements. Since the switch is quality of service aware (QOS), the QOS requirements arThe A/D converter and filter provides in this embodiment 200M samples per second, 12 bits, 700 MHz bandwidth device. It is used to directly sample the IF signal for the SDMP.

The SDMP IF Signal is generated directly using a 14 Bit DAC, with a sampling speed of 300 MSamples/s. The D/A converter and filter large dynamic range is used to both control the output power and to mute the signal in the proposed TDMA scheme.

The L-Band up converter converts the SDMP IF frequency to cover the 950 MHz to 1.450 GHz L-Band range. The up converter uses the OCXO 10 MHz reference to produce an accurate and low phase noise output waveform. A voltage controlled amplifier is used to adjust the output power. The output is then combined with the 10 MHz reference before being sent to the ODU.

The L-Band down converter operates in much the same way as the up-converter. It accepts a L-Band signal from 950 MHz to 1.450 GHz. The down converter uses the OCXO 10 MHz reference to limit the phase noise contribution of the down converter to the received waveform. A voltage controlled amplifier is used to adjust the receive power in order to fit with the SDMP IF requirements.

The telemetry for the ODU is send over an RS-485 signal.

The CAU hosts the 10 MHz OCXO crystal required by the ODU to up-convert the L-band signal to the satellite. This reference has severe phase noise requirements and hence is very stable. This reference is transmitted to the CAU up and down converters and to the SDMP. The SDMP uses the reference as a clock source when the IDU is selected to be the network master.

The display driver encompasses the circuitry required to interface the selected display with the SDMP. The selected display incorporates both a 2 lines by 16 character matrix with a 6 button touch pad that includes 4 directional arrows and Accept and Reject button.

Functionalities of the Modem

Figure 9:
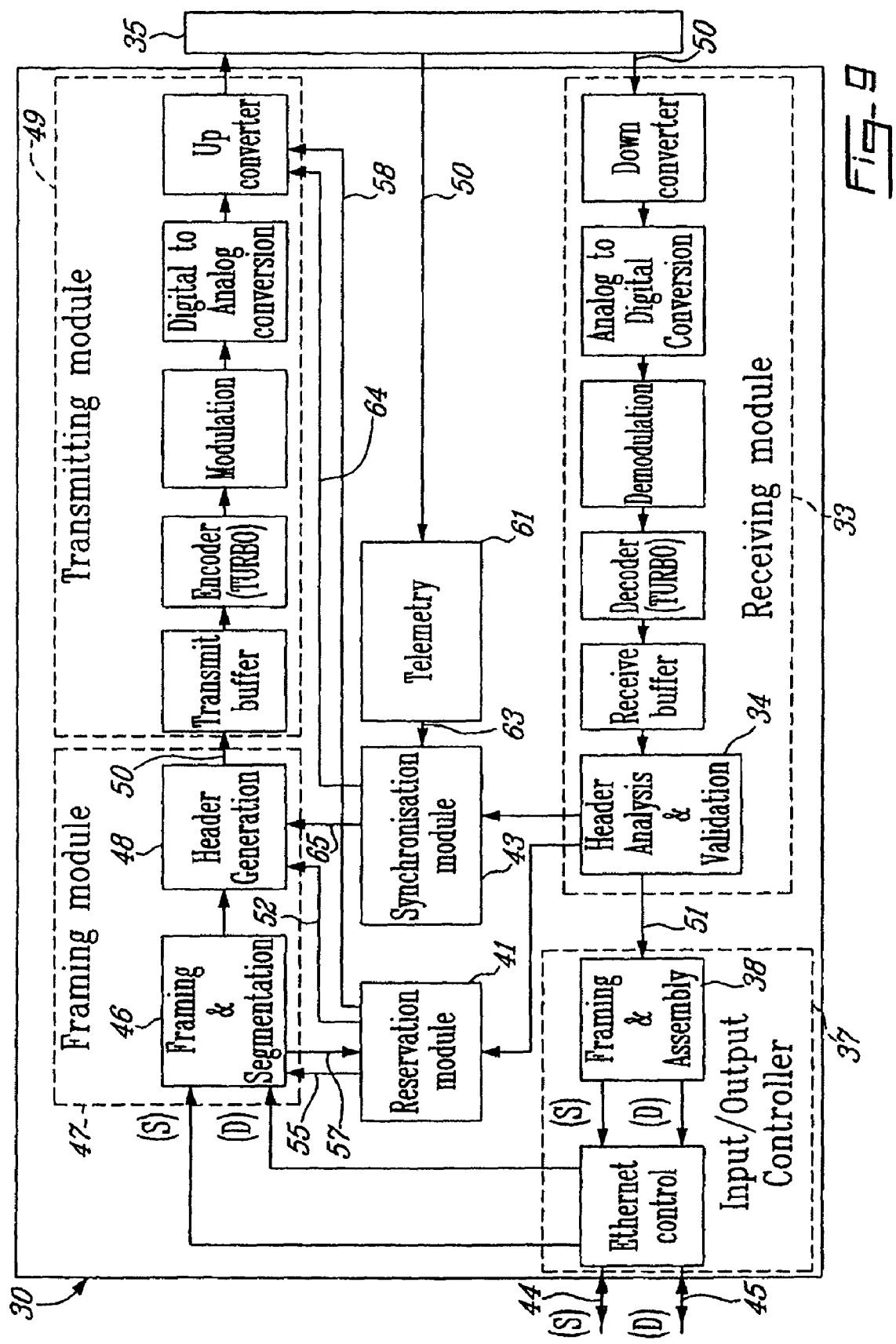
FIG. 9 is a block diagram illustrating the main functionalities of the modem in accordance with the preferred embodiment of the present invention.

We will now describe the main functionalities of the modem, how they are interconnected and how they relate to each other. FIG. 9 is a block diagram illustrating the main functionalities of the modem 30 in accordance with the preferred embodiment of the present invention.

As illustrated in FIG. 9, a receiving module 33 receives, from the outdoor unit 35, the received signal 50 encoding the priority traffic data, the high flow traffic data and the reservation data from the TDMA satellite link. This received signal therefore provides for a received data 51 which is relayed to the modem Ethernet ports 44,45, via an input/output controller unit 37. The input/output controller unit 37 is configured to send the received high priority traffic to the Ethernet port labeled dedicated bandwidth port 45 and to send the received low priority traffic to the Ethernet port labeled shared-bandwidth port 44. A framing and assembling module 38, being a part of the input/output controller 37, prepares the received data in an appropriate format prior to relaying them to the Ethernet ports 44,45.

The input/output controller 37 is also responsible for relaying the data entering the modem via the Ethernet ports 44,45 to the framing module 47, where the data is prepared to be sent in the appropriate sub-frames of the TDMA link. This framing operation is performed to respect the frame architecture that was described earlier in the disclosure and is performed according to the assignment rules also disclosed earlier. The output 59 of the framing module 47 is thus prepared data for transmission, referred to as the framed data that will be transmitted by the transmitting module 49 in a well-synchronized manner to fit in the site allowed time windows of the TDMA link.

The framing module 47 also plays the role of buffering the data arriving at the shared-bandwidth port 44 of the modem 30 that cannot be transmitted right away for lack of available sub-frames in the shared-bandwidth of the link.

As illustrated in the FIG. 9, the framing module 47 comprises a framing and segmentation module 46 followed by an header generation module 48. The header generation module 48 is responsible for generating the header of each sub-frame prepared by the framing module 47 prior to their transmission. It is in this header that the synchronization status flag of the site is issued. The header also comprises useful information related to the frame architecture and to the reservation bandwidth architecture, as well as the reservations made by the sites to acquire a part of the shared-bandwidth of the TDMA link. The framing and segmentation module 46 is responsible to prepare the data contents of the dedicated sub-frames as well as the bursts sub-frames of the shared-bandwidth the site was allowed to have.

As already mentioned, the synchronization of the data transmission is very important in a network based on a TDMA link. The data must be transmitted in the allowed time-window of the link in order to have an efficient communication link. Therefore, the transmission of the data must be well-synchronized with respect to a reference clock.

As discussed earlier in the disclosure, the present invention provides for a series of synchronization rules according to which one of the sites of the network is elected to be the master clock, or in other words, is elected to provide the reference clock. Therefore all sites must synchronized their operations to this reference clock and the synchronization module 43 in FIG. 9 is the module responsible for implementing those synchronization rules.

In order to manage the synchronization of the modem 30, the synchronization module 43 is linked to the receiving module 33, to the framing module 47 and to the transmitting module 49. Via the link 53 between the receiving module 33 and the synchronization module 43, the synchronization module 43 acknowledges from the information found in the received data 51 which site is the master and gets the reference clock. This information is found in the headers of the sub-frames of the received data with the help of the header analysis and validation module 34 of the receiving module 33. This reference clock information is relayed to the transmitting module 49, via the link 64, to ensure that the data are transmitted exactly at the time they should be.

The synchronization module 43 also receives a telemetry signal 63 from the telemetry module 61, information the synchronization module 43 about the power status of the sites of the network. This information is used in accordance to the synchronization rules described earlier to determine if a site can stay the master or not, and also if the site to which the modem 30 is linked can become the master. In the case that a change in the synchronization status of the sites is necessary, the synchronization module 43 will implement the change by sending a master control signal 65 to the framing module 47 to modify accordingly the synchronization flag status of the site.

The synchronization module 43 also provides to the framing module 47, via the master control signal 65, the necessary information for the framing module 47 to generated sub-frames that are correctly synchronized with respect to the reference time of the network.

The reservation module 41 is the module that manages the bandwidth resources of the TDMA link. To provide this management, the reservation module 41 is linked to the framing module 47, to the transmission module 49, and to the receiving module 33.

First of all, the reservation module 41 acknowledges, via the link 66, from the received data 51 of a received super-frame, the reservations that were made by the sites of the network to transmit in the shared-bandwidth of the next super-frame. In a preferred embodiment, these reservations were sent in the header of the last dedicated sub-frames of the super-frame and are decoded via the header analysis and validation module 34. From these reservations and according to the previously described assignment protocol, the reservation module 41 establishes which sites are going to be able to transmit in the shared-bandwidth of the next super-frame, and in which order they will be allowed to transmit. Accordingly the reservation module 41 informs the framing module 47, via the assignment signal 55, if the site is allowed or not to transmit in the next super-frame, and if so, in which sub-frames of the dedicated bandwidth of the super-frame. When receiving this signal 55 from the reservation module 41 the framing module 47 can prepare accordingly the data from the priority and/or the high flow traffic that will be transmitted in the next super-frame.

Secondly, the reservation module 41 receives from the framing module 47 a buffer signal status 57 about the buffer content and determines from the buffer content of the framing module 47 and the received reservations, if the site needs to request time in the shared-bandwidth of future super-frames. In the affirmative, the reservation module 41 will inform the framing module 47 of making in the next super-frame a reservation by sending to the header generation 48 a reservation signal 52.

Finally the reservation module 41 is also linked 58 to the transmitting module 49 in order to inform the transmitting module 49 of the transmission time-sequence that the transmitting module 49 will have to provide.

Therefore, this modem 30 provides the transmission of the data from the site, the reception of the data from the network of sites and the management of the bandwidth resources of the (TDMA) satellite link shared by the network of sites.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claim.

What is claimed is:

1. A method for providing to a network of sites, sharing a time-division multiple-access (TDMA) satellite link, a dedicated bandwidth for priority traffic and a shared dynamic bandwidth for high flow traffic, the method comprising:
   providing to each site a dedicated bandwidth for priority traffic by assigning to each site at least one dedicated sub-frame, said sub-frame being a time-slot during which the site transmits, and said sub-frame being one of a series of sequential sub-frames organized in a time-repeating sequence called a frame, said frame further comprising in its time sequence a burst sub-frame corresponding to the shared bandwidth available for high flow traffic;
   providing to each site, at a regular time interval, a reservation micro time-slot during which the site can transmit a reservation for the burst sub-frame of a frame to come;
   at each site determining when the reservation is to be sent as a function of an assignment protocol and a buffer status and transmitting the reservation;
   assigning at each site, as a function of said reservations and according to said assignment protocol, the burst sub-frame to a corresponding site that will be allowed to transmit during said burst sub-frame, therefore providing to the network a dynamic bandwidth for high flow traffic; and
   at said corresponding site determining when high flow traffic data is to be sent as a function of said reservations and said assignment protocol and transmitting the high flow traffic data.

2. The method as claimed in claim 1, wherein said providing the dedicated bandwidth and the shared dynamic bandwidth comprises:
   determining a number of active sites among the sites of the network to which will be assigned the dedicated bandwidth;
   unassigning the dedicated sub-frames of the sites that are not the active sites and incorporating said sub-frames into the burst sub-frame, therefore redistributing the bandwidth resource of the link between said dedicated bandwidth and said shared dynamic bandwidth, wherein frame duration is constant.

3. The method as claimed in claim 1, wherein the number of the dedicated sub-frames in the frame equals the number of sites in the network.

4. The method as claimed in claim 1, wherein the frame has a time duration of about 23.8 ms.

5. The method as claimed in claim 1, wherein said reservation micro time-slot during which the site transmits the reservation is a part of the dedicated sub-frame assigned to the site.

6. The method as claimed in claim 1, wherein said regular time interval at which the reservation micro time-slot is provided to the site is a group of N sequential frames called a super-frame.

7. The method as claimed in claim 6, wherein said super-frame has a time duration of about 333 ms and comprises 14 frames, each of them having a time duration of about 23.8 ms.

8. The method as claimed in claim 6, wherein said reservation micro time-slot during which the site can transmit the reservation is located in a previous super-frame and wherein said frame to come is located in a super-frame to come, the method therefore allowing each site to reserve in the previous super-frame, the burst sub-frame of at least one frame of the super-frame to come for high flow traffic.

9. The method as claimed in claim 8, wherein said previous super-frame and said super-frame to come are separated by a time interval equal to a super-frame.

10. The method as claimed in claim 6, wherein said assigning comprises establishing an orderly sequence of N sites.

11. The method as claimed in claim 10, wherein said sequence comprises at least one of the sites that transmitted a reservation.

12. The method as claimed in claim 8, wherein said assigning comprises establishing an orderly sequence of N sites that will be allowed to transmit accordingly to said orderly sequence in the super-frame to come.

13. The method as claimed in claim 12, wherein said sequence comprises at least one of the sites that transmitted a reservation in the previous super-frame.

14. The method as claimed in claim 10, wherein said assignment protocol comprises:
establishing for each super-frame a starting point site;
assigning one frame to each site that made a reservation, and if there are remaining frames, assigning another frame to each site that demands two frames, and so on until all the demands have been fulfilled or until all the frames of a super-frame have been assigned, and obtaining as a result a sequence of N sites;
ordering the sequence of N sites in a cyclic ascending order of their site number starting from the site that has the closest number to the starting point site.

15. The method as claimed in claim 8, wherein said assigning comprises an automatic assigning procedure based on having the assignment protocol distributed among all the sites so that when the sites receive the reservations made in a previous super-frame they know automatically which sites and in which order can transmit in the burst sub-frames of the super-frame to come.

16. The method as claimed in claim 15, wherein said assigning comprises establishing an orderly sequence of N sites that will be allowed to transmit accordingly to said orderly sequence in the super-frame to come.

17. The method as claimed in claim 16, wherein said sequence comprises at least one of the sites that transmitted a reservation in the previous super-frame.

18. The method as claimed in claim 16, wherein said assignment protocol comprises:
establishing for each super-frame a starting point site;
assigning one frame to each site that made a reservation, and if there are remaining frames, assigning another frame to each site that demands two frames, and so on until all the demands have been fulfilled or until all the frames of a super-frame have been assigned, and obtaining as a result a sequence of N sites;
ordering the N sites in a cyclic ascending order of their site number starting from the site that has the closest number to the starting point site.

19. A modem to transmit data from a site, to receive data from a network of sites and to manage bandwidth resources of a time-division multiple access (TDMA) satellite link shared by the network of sites, wherein said TDMA link provides to the network of sites a shared bandwidth for high flow traffic data, and provides to each site a dedicated bandwidth for priority traffic data and provides to each sites a reservation bandwidth for reservation data in which the site can request a time-slot of the shared bandwidth, the modem comprising:
a receiving module receiving a received signal encoding the priority traffic data, the high flow traffic data and the reservation data from the TDMA satellite link, for providing received data;
a transmitting module receiving framed data of the site to be transmitted and a synchronization signal, for transmitting, as a function of said synchronization signal, the framed data through the TDMA satellite link;
a dedicated bandwidth port for coupling the priority traffic data of a subscriber equipment to the modem;
a shared bandwidth port for coupling the high flow traffic data of the subscriber equipment to the modem;
a synchronization module coupled to the receiving module for providing, as a function of the received data, a reference clock time and for generating said synchronization signal;
a framing module, receiving a priority traffic data to transmit, a high flow traffic data to transmit, an assignment signal and a reservation signal, for storing momentarily in a buffer the high flow traffic data to transmit until its transmission and providing a buffer status signal about a status of a content of the buffer, and for generating, as a function of said high flow and priority traffic data to transmit and as a function of said assignment signal and said reservation signal, the framed data of the site to be transmitted;
an input/output controller module, receiving the priority traffic data to transmit from the dedicated bandwidth port, the high flow traffic data to transmit from the shared-bandwidth port and the received data, for relaying said priority and high flow traffic data to transmit to the framing module, for relaying a received priority traffic of the received data to the dedicated bandwidth port and for relaying a received high flow traffic data of the received data to the shared-bandwidth port;
a reservation module, adapted to manage the reservation data and the shared-bandwidth resources, having a first port connected to the receiving module for acknowledging from the reservation data of the received data said time-slot requests of the sites, and having a second port connected to the framing module, for receiving the buffer status signal and for transmitting to the framing module the assignment signal and the reservation signal, said reservation module
generating, as a function of said requests of the sites and as a function of an assignment protocol, the assignment signal informing the framing module when to incorporate, in said framed data, the high flow traffic data to transmit in the shared-bandwidth of the TDMA link, and
generating, in response to the buffer status signal and as a function of the assignment protocol, the reservation signal informing the framing module when to request, in the reservation data, a time-slot of the shared-bandwidth of the TDMA link.

20. The modem as claimed in claim 19, wherein said dedicated and shared bandwidth ports are Ethernet ports, and said input/output controller comprises a framing and assembly module, wherein said framing and assembly module extracts from the received data the received high flow traffic data and formats said received high flow traffic data into packets for the shared-bandwidth port, and extracts from the received data the received priority traffic data and formats said received priority traffic data into packets for the dedicated-bandwidth port.

21. The modem as claimed in claim 19, wherein said assignment protocol comprises:
establishing, for each time interval called a super-frame, a starting point site, wherein said super-frame comprises N burst sub-frames;
trying to assign one burst sub-frame to each sites that made said request, and if there are remaining burst sub-frames, trying to assign another burst sub-frame to each site that demand two burst sub-frames, and so on until all the demands have been fulfilled or until all the sub-frames of a super-frame have been assigned, and obtaining as a result a sequence of N sites;
ordering the sequence of N sites in an ascending order of their site number starting from the site that has the closest number to starting point site, thereby generating a sequence of sites.

22. The modem as claimed in claim 19, wherein said framing module comprises a header generation module, said header generation module generating a header in said framed data, said header being encoded as a function of the reservation signal to contain said request a time-slot of the shared bandwidth.

23. The modem as claimed in claim 22, wherein said receiving module comprises a header analyzer module, said header analyzer decoding the header of the received data for relaying to the reservation module the reservation data of the received data.

24. The modem as claimed in claim 19, further comprising a telemetry module, wherein said telemetry module establishes power level statuses of the sites of the network upon reception of said received signal, and generates, as a function of said power level statuses, a telemetry signal which is relayed to the synchronization module.

25. The modem as claimed in claim 24, wherein said synchronization module comprises a master manager module, said master manager module
- acknowledging from said received data a synchronization status for each of the sites,
- acknowledging from said telemetry signal the power statuses of the sites,
- determining from said synchronization and power statuses which site is a master clock, said master clock being the reference clock, and
- generating, as a function of said determining the master clock, a master control signal that is relayed to the framing module.

26. The modem as claimed in claim 25, wherein said receiving module comprises a header analyzer module, said header generation module generating a header in said framed data, said header being encoded as a function of the reservation signal with said request a time-slot of the shared-bandwidth, and said header being further encoded as a function of the master control signal with the synchronization status of the site.

27. The modem as claimed in claim 26, wherein said receiving module comprises a header analyzer module, said header analyzer decoding the header of the received data for relaying to the reservation module the reservation data of the received data and for further relaying to the synchronization module said synchronization statuses of the received data.

28. The modem as claimed in claim 27, wherein said synchronization module further comprises a frame reconfiguration module which, upon reception of a reconfiguration code in the received data manages changes in the bandwidth resources of the TDMA link.

29. A communication network comprising a plurality of sites, said sites sharing a time-division multiple-access (TDMA) satellite link, wherein said TDMA link provides to the network of sites a shared bandwidth for high flow traffic data, and provides to each site a dedicated bandwidth for priority traffic data and provides to each sites a reservation bandwidth for reservation data in which the site can request a time-slot of the shared bandwidth, and wherein each sites are equipped with the modem as defined in claim 19.

30. The communication network as claimed in claim 29, wherein said assignment protocol of the modem comprises a modem-embedded protocol shared by all sites.

31. The communication network as claimed in claim 30, wherein said network does not need an external master controller to manage said bandwidth resources of the TDMA link.

* * * * *